United States Patent
Schilling et al.

(10) Patent No.: US 6,604,667 B2
(45) Date of Patent: Aug. 12, 2003

(54) DEVICE FOR JOINING, BY FRICTION STIR WELDING, AT LEAST TWO WORKPIECES

(75) Inventors: Christoph Schilling, Meyn (DE); Jorge dos Santos, Lüneburg (DE)

(73) Assignee: GKSS-Forschungszentrum Geesthacht GmbH, Geecsthacht (DE)

( * ) Notice: Subject to any disclaimer, the term of this patent is extended or adjusted under 35 U.S.C. 154(b) by 0 days.

(21) Appl. No.: 10/172,818

(22) Filed: May 16, 2002

(65) Prior Publication Data

US 2002/0179674 A1 Dec. 5, 2002

Related U.S. Application Data

(63) Continuation-in-part of application No. PCT/DE00/04055, filed on Nov. 17, 2000.

(30) Foreign Application Priority Data

Nov. 18, 1999 (DE) .......................................... 199 56 963

(51) Int. Cl.[7] .......................... B23K 20/12; B23K 37/00
(52) U.S. Cl. ..................................... 228/2.1; 228/112.1
(58) Field of Search ............................... 228/112.1, 2.1

(56) References Cited

U.S. PATENT DOCUMENTS 6,302,315 B1 * 10/2001 Thompson ............... 228/112.1
6,540,128 B2 * 4/2003 Hirano et al.
2002/0145031 A1 * 10/2002 Hirano et al.
2002/0179674 A1 * 12/2002 Schilling et al.
2003/0029903 A1 * 2/2003 Kashiki et al.
2003/0066869 A1 * 4/2003 Johnson et al.

FOREIGN PATENT DOCUMENTS

DE   WO/01/36145 A1 * 5/2001
JP       10166165 A * 6/1998
JP      02002137067 A * 5/2002

* cited by examiner

Primary Examiner—Tom Dunn
Assistant Examiner—Kiley Stoner
(74) Attorney, Agent, or Firm—Klaus J. Bach

(57) ABSTRACT

In a device for joining, by friction stir welding, at least two workpieces, a support structure is provided with a head portion which includes drive means and a shaft which is rotatable by the drive means and has a pin-like projection projecting toward a support member of the support structure for supporting workpieces to be joined by friction stir welding and wherein guide means are provided for moving the rotating pin-like projection into contact with, and into, the workpieces while plasticizing the workpieces in the contact area to form thereby a spot weld by friction stir welding.

9 Claims, 4 Drawing Sheets

22

23

DEVICE FOR JOINING, BY FRICTION STIR WELDING, AT LEAST TWO WORKPIECES

This is a Continuation-In-Part application of International Application PCT/DE00/04055 filed Nov. 17, 2000 and claiming the priority of German Application 199 56 963.0 filed Nov. 18, 1999.

BACKGROUND OF THE INVENTION

The invention relates to a device for joining, by friction stir welding, at least two workpieces, which are disposed adjacent one another in a contact area, including a rotatable shaft having a driven end and, at the opposite end, a pin-like projection which is in contact with the workpieces in the contact area, and, upon rotation of the shaft, heats and plasticizes the workpiece materials in the contact area.

EP-B-0615 480 discloses a friction stir welding procedure (FSW) which has been known for several years. Originally, for friction welding two workpieces which were to be joined were moved relative to each other in the area in which they were to be joined while they were pressed against each other with a predetermined force. As a result of the heat generated by the friction, the materials of the workpieces were finally plasticized in the joining area. Upon sufficient plastification of the materials of the workpieces in the joining area, the workpiece materials are sufficiently mixed in the jointure area so that, upon cooling, the desired weld connection between the two workpieces is established.

In a friction stir welding device, a pin-like projection is driven by a drive, or respectively, motor at a suitably high speed so that two adjacent workpieces between which the pin-like projection is moved for example by a special guide structure or by a robot are joined in the butt area. When the workpiece materials in the butt are are sufficiently heated by the friction generated by the rotating pin-like projection so that the yare plasticized, the pin-like projection is moved along the butt edges of the two work pieces so as to form a longitudinal weld seam.

It is known to interconnect two or more metallic workpieces by spot-weld connections which, in comparison with rivet or bolt connections, have the advantage that no additional joining elements (rivet or, respectively, bolts or screws) are needed. In addition, the spot welding process is substantially faster since no bores have to be drilled, no rivets or screws have to be inserted into the bores and no rivet heads have to be formed and bolts or screws have to be mounted in order to engage the two workpieces with each other.

While two workpieces of iron or steel or alloys thereof which are disposed on top of each other can be easily joined by commercially available spot welding apparatus, two or more workpieces of aluminum alloys as they are used in the airplane or motor vehicle manufacture are difficult to join by the electric spot welding apparatus.

The reason is that aluminum and aluminum alloys form with the oxygen of the ambient air an oxide surface layer which, on one hand, forms a substantial electric resistance between the workpieces to be joined. On the other hand, the oxides are contained in the plasticized material of the workpieces so that aluminum oxide is disposed in the jointure between the two workpieces at relatively high local concentrations. As a result, the spot welding joints of workpieces of aluminum or aluminum alloys do not have the strength required for many applications.

For this reason, particularly in the airplane manufacture where the highest quality joints are required, the connection of aluminum workpieces by spot welding has been abandoned and the workpieces are again being joined by rivets. The same is true for the motor vehicle manufacture although aluminum is being increasingly used for vehicle chassis and body parts.

It is further known that, particularly in the manufacture of motor vehicles, increasingly manufacturing robots are used which perform various assembly operations including the joining of workpieces. The manufacturing robots include tool heads on which the respective special tool or equipment is mounted for performing particular tasks such as the joining of two or more workpieces. Such equipment has been employed so far in connection with robots only for establishing conventional spot welding connections, which are formed by conventional electric spot-welding apparatus for the jointure of workpieces of iron or steel, that is, essentially for joining iron or steel sheets. Workpieces of aluminum or aluminum alloys as they are used more and more also in the construction of motor vehicles are not being joined by spot welding because of the disadvantages mentioned earlier. It has furthermore been assumed that the friction stir welding procedure is not suitable for the formation of spot-like weld joints.

It is the object of the present invention therefore to provide a device for establishing, in a simple manner, high-strength spot weld connections between workpieces wherein the jointure between the workpieces is essentially free of oxides of the workpiece materials and which can be operated essentially continuously and in a simple manner also in connection with a manufacturing robot.

SUMMARY OF THE INVENTION

In a device for joining, by friction stir welding, at least two workpieces, a support structure is provided with a head portion which includes drive means and a shaft which is rotatable by the drive means has a pin-like projection projecting toward a support member of the support structure for supporting workpieces to be joined by friction stir welding and guide means are provided for moving the rotating pin-like projection into contact with, and into, the workpieces while plasticizing the workpieces in the contact area to form thereby a spot weld by friction stir welding.

With the device according to the invention, two or more workpieces can be joined by spot welds using the friction stir welding procedure. Such spot welds could be formed so far only by electric spot welding apparatus, which however, as described above, could be used for certain materials, particularly aluminum and aluminum alloys only in a very limited way because of the disadvantages mentioned earlier. With the solution according to the invention, it is possible to join workpieces by spot welding which, so far, could not be joined by the available spot welding methods, particularly workpieces of aluminum or aluminum alloys without the need for a particular preparation of the jointure area. There is no need to drill bores into the workpieces, no additional connecting means are required and no separate work procedure is needed such as the formation of a rivet head or of a screw connection including a nut. With the device, spot-like weld connections can be formed by friction stir welding or the jointure can be established by a seam along a certain welding length depending on the control for the movement of the guide means which moves the pin-like projections of the friction stir welding device.

In an advantageous embodiment of the device, the guide means is a pivot arm, which is pivotable about an axis that extends parallel to the axis of the pin-like projection. The pivot arm, which itself is rigid, supports and guides the pin-like projection such that it is guided along a circular path. However, it is pointed out that the pivot arm does not necessarily have to be pivotable about an axis which extends parallel to the axis of the pin-like projection. Rather, the pivot arm may also be movable linearly and also along the pivot axis so that a linearly extended spot-like welding joint can be established.

If the pivot arm performs a circular motion around an axis parallel to the axis of the pin-like projection, it is advantageous if the arc of the circle of the movement corresponds essentially to the length of the friction welding seam.

It is advantageous if the pivot arm at whose free end the pin-like projection is arranged, is pivotable independently of a robot, on which the device is mounted, so that the pin-like projection can be moved to some extent without the need for controlling and actuating the robot. To this end, the device includes expediently a piston-cylinder structure by way of which the pin-like projection is movable along the workpieces or relative to the workpieces. However in place of a pneumatic or hydraulic piston-cylinder operating structure, an electromechanically operated actuator may be provided which is driven by an electric motor.

In order to ensure that, during the quasi-spot welding step, the workpieces to be joined are pressed against one another with high precision so that they can move neither relative to each other nor relative to the welding tool formed by the pin-like projection, it is advantageous if the device includes a clamping lever by means of which the workpieces can be biased toward each other and against a support member.

The biasing of the workpieces against each other and into engagement with a support member is preferably also achieved by means of an actuator, which is part of the device. Preferably it is also a piston-cylinder structure by which the clamping lever is movable between a clamping and a release position. However, also in this case, the actuator may be an electromechanical operating structure.

In another advantageous embodiment of the invention, the device includes a head portion which includes the drive for the pin-like projection. The head portion is preferably so supported that it can move the pin-like projection also axially for forming the spot welding joint and for retracting the pin-like projection after completion of the spot welding joint. In this way, also the movement of the pin-like projection toward the workpieces to be joined, and away therefrom after completion of the spot-welding joint, is initiated by the device itself so that no control and no movement of the robot is needed for that purpose. Also, the rotation of the pin-like projection is preferably provided for by a drive disposed in the head portion.

In order to ensure under all operating conditions and for all workpiece thicknesses, an orthogonal or possibly about 3° angled engagement of the pin-like projection with the surface of the workpiece at least in the area where the pin-like projection comes into contact with the surface of the closest workpiece, the head portion is preferably movable by means of spaced yoke-like pivot elements, which form, together with the head portion and a rotating member which is rotatable about the pivot axis of the pivot arm, an essentially parallelogram-like structure. In this way, the selected angle of the axis of the pin-like projection relative to the workpieces to be joined remains unchanged.

Finally it is also advantageous if the head portion is movable by a device-internal actuator, which may also be pneumatically or hydraulically operated by a piston-cylinder structure or by a motor operated electromechanical actuator.

With the use of the device according to the invention in connection with a manufacturing robot, the manufacturing robot only needs to move the device to the location and position the device properly at such location, where the spot or spot-like welding connection of the workpiece is to be established.

Below, the invention will be described in greater detail on the basis of the accompanying schematic drawings.

DESCRIPTION OF A PREFERRED EMBODIMENT

Figure 1:
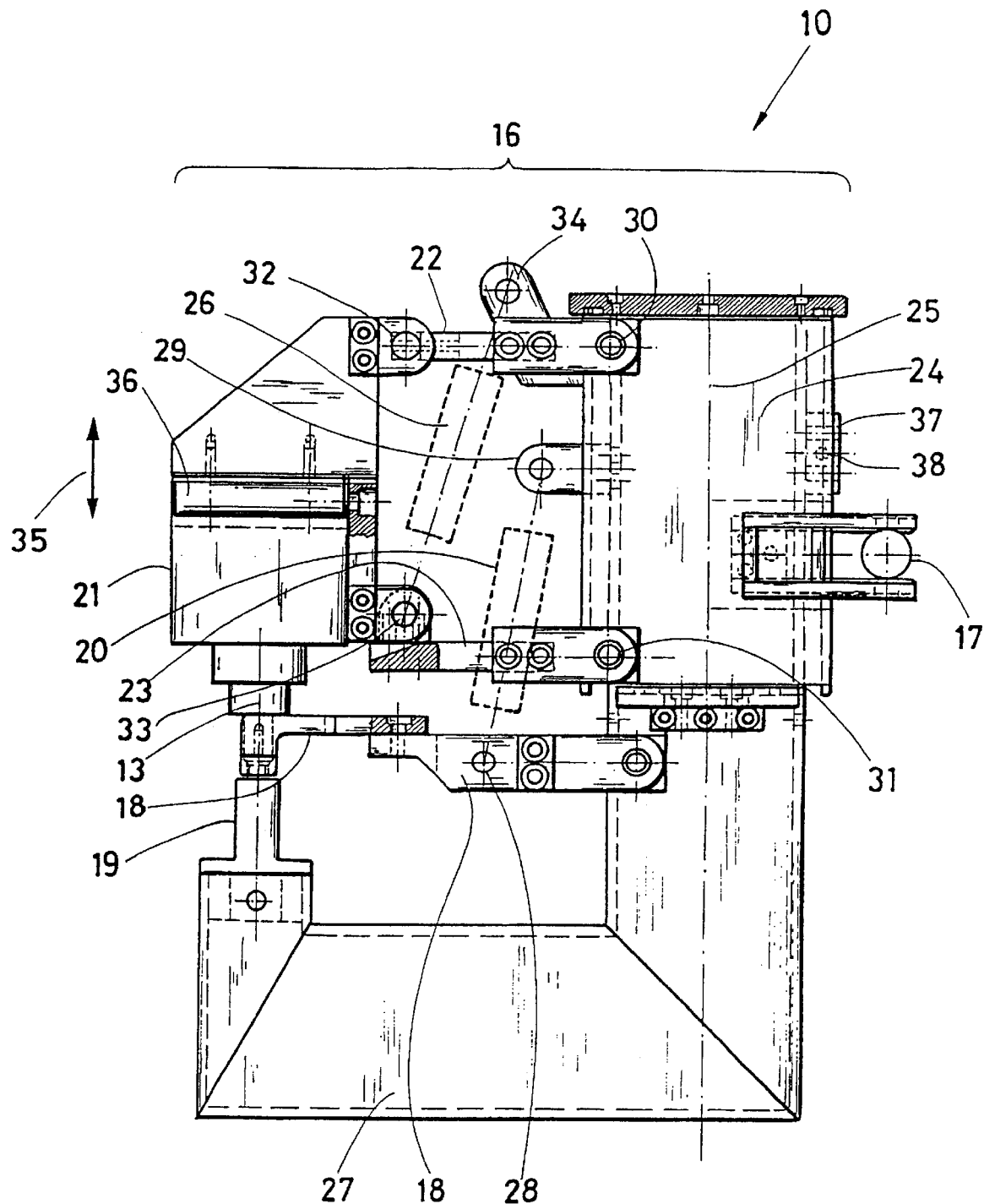
FIG. 1 is a front view of a device according to the invention.
Figure 2:
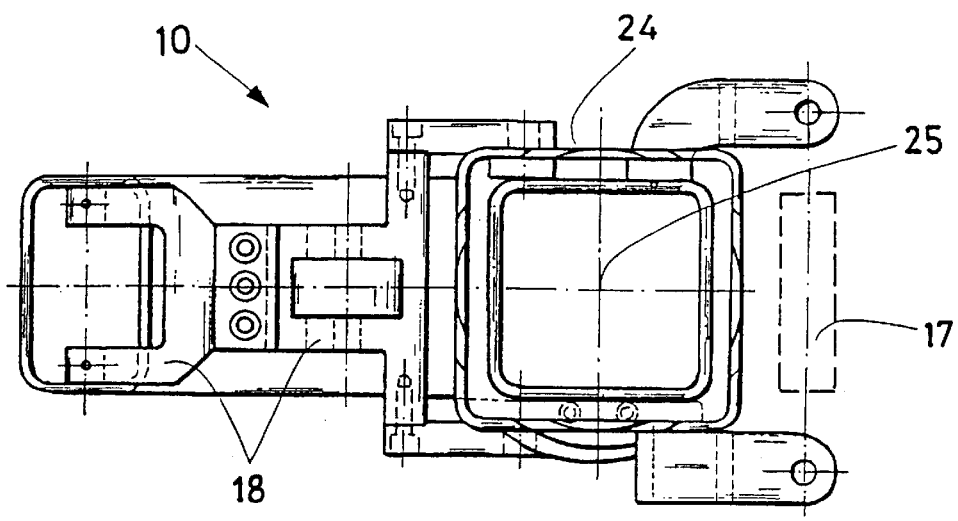
FIG. 2 is a top view of the device shown in FIG. 1, wherein non-essential features have been eliminated.
Figure 3:
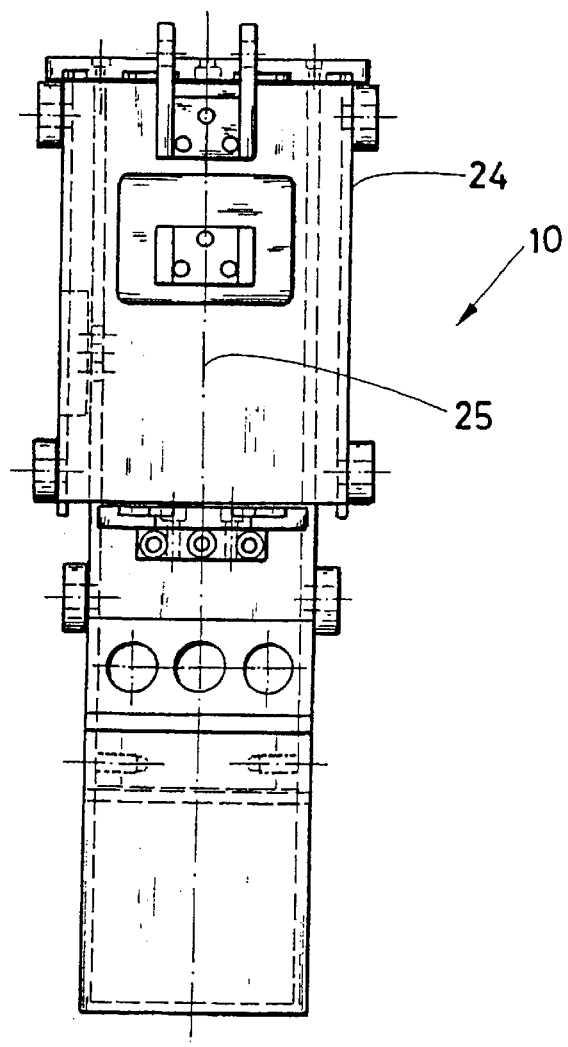
FIG. 3 is a side view of the device shown in FIG. 1, wherein non-essential features are not shown.
Figure 4:
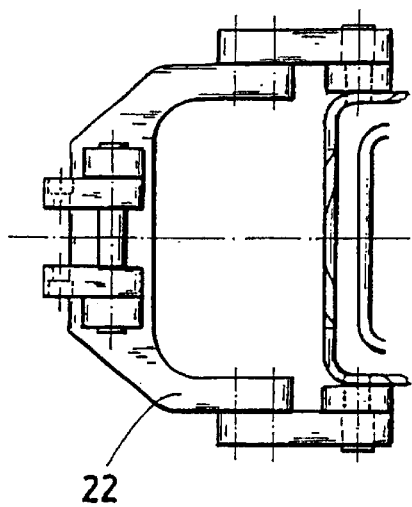
FIG. 4 is a partial view of the device showing a first lower pivot element.
Figure 5:
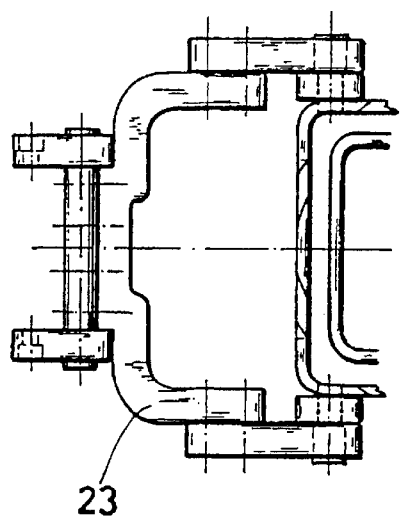
FIG. 5 is a partial view of the device showing a second upper pivot element.
Figure 8:
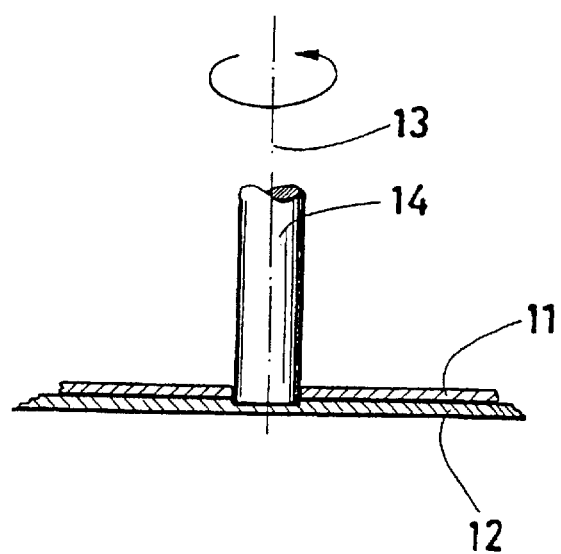
FIG. 8 is a side view of the spot weld shown in FIG. 7.

The device 10 according to the invention comprises a head portion 21 with a drive structure for a friction stir welding device (not shown in detail). The friction stir welding device comprises essentially a pin-like projection 14, which can be rotated by the drive structure disposed in the head portion 21 in order to interconnect the workpieces 11 and 12 (FIG. 8) by a spot-like or quasi spot-like friction stir welding joint as will be explained further below. The head portion 21 is supported by a first upper pivot arm 22 and a second lower pivot arm 23, (see FIGS. 4, 5) which are mounted on a rotatable element 24, which is supported on a lower support structure 27 rotatably about an axis 25. The lower hook-shaped structure 27 is stationary. Rotation of the rotatable element 24 is initiated by an actuator which is shown here in the form of a hydraulically or pneumatically operated piston-cylinder unit 17, see FIG. 2, and which can be pivoted along a predetermined arc section or along a length 15 corresponding to the desired length of the quasi-spot-like welding connection of the workpieces 11, 12.

On the stationary lower support structure 27 of the device 10, a clamping element 18 is pivotally supported and is operable by an actuator 20, which is shown in the drawings as a hydraulically or pneumatically operable piston-cylinder structure. The piston cylinder structure 20 is connected at one end to the clamping element 20 so as to be rotatable in an eye 28 and, at its other end, is supported by an eye structure 29, which extends from a stationary part of the support structure 27, which is surrounded by the rotatable element 24.

Below the pin-like projection 14, the lower part of the stationary support structure 27 is provided with a support member 19, which is disposed in axial alignment with the pin-like projection 14 of the device 10. The workpieces 11, 12 to be joined are first positioned on the support member 19 and are held in position on the support member 19 by a suitable control, or respectively, by actuation of the piston-cylinder arrangement 20.

The head portion 21 forms, together with the two pivot arms 22, 23 and the rotatable element 24, a parallelogram-like structure wherein the two pivot arms 22, 23 are mounted to the rotatable element 24 by way of pivot points, or respectively, eyelets 30, 31 and to the head portion 21 by way of pivot points or, respectively, eyelets 32, 33.

Another actuator, which is also in the form of a piston cylinder structure 26 and which extends between an eyelet 34, where it is pivotally supported and, for example, the eyelet 33 where it is also pivotally supported, is provided for lowering and raising the head portion 21 in the direction of the arrow 35 by suitable hydraulic or pneumatic control means. By controlled movement of the piston-cylinder structure 26 consequently the head portion 21 and the pin-like projection 24 mounted thereon can be lowered onto the workpieces to be joined and raised therefrom.

Figure 6:
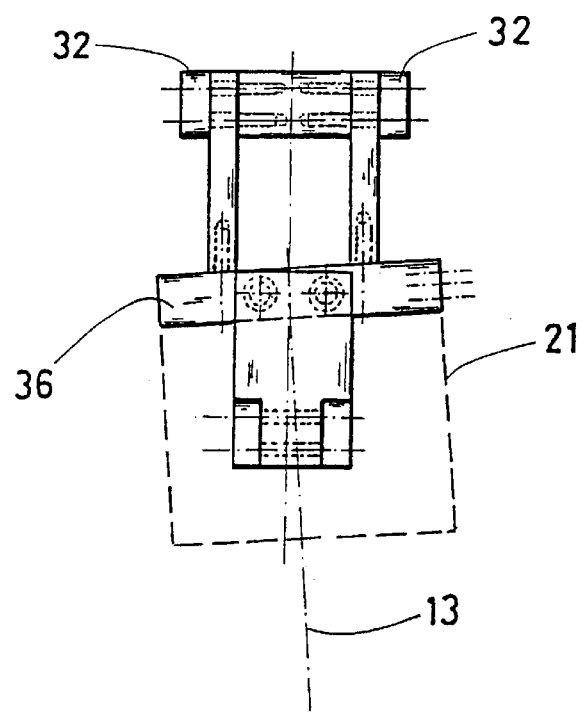
FIG. 6 is a partial view of the head portion of the device without non-essential features.
Figure 7:
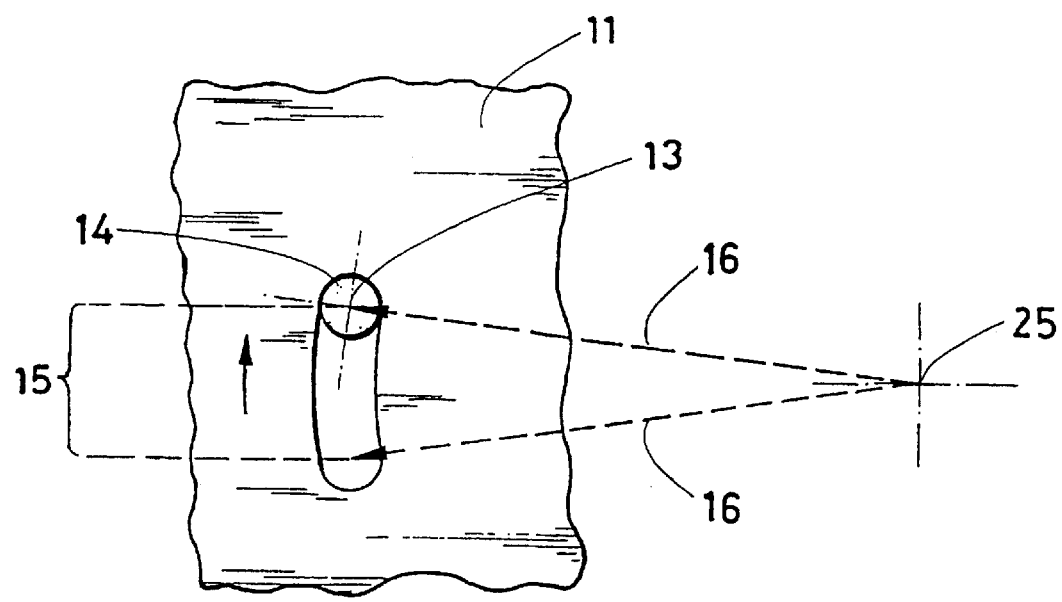
FIG. 7 is a top view of a spot weld which is in the form of a partial circular arc.

The head portion 21, which is shown in FIG. 6 by dashed lines 21, is inclined in the direction of movement of the pin-like projection, that is, relative to the axis 13 of the pin-like projection by about 3°, which is advantageous for generating a weld connection in accordance with the friction stir welding procedure.

A quasi spot-like weld connection between two workpieces 11, 12 is established by the device 10 in the following way:

A manufacturing robot, which is not shown, or another suitable manufacturing apparatus moves the device 10 to a location where the connection between the two workpieces is to be established. Then the pin-like projection is rotated by a drive disposed in the head portion 21, after the rotatable element 24 has been moved to an appropriate position by the piston cylinder unit 17. In this position, the rotatable element 24 is placed for example against a stop 27, which can be adjusted by a set screw 38. First, the head portion 21 is raised by the piston cylinder structure 26 to its maximum level together with the pin-like projection 14. The piston-cylinder-actuator 20 is also actuated so that the clamping element 18 is raised.

By means of the manufacturing robot, the device 10 is then moved accurately to the location where the workpieces 11, 12 are to be joined. The intended point of jointure is then located immediately above the support member 19. By means of the piston-cylinder unit 20, the clamping element is then moved onto the two workpieces 11, 12 so that the workpieces 11, 12 to be joined are immovably held between the clamping element 18 and the support member 19 whereby they are also firmly positioned relative to the pin-like projection 14. Subsequently, the head portion 21 is moved by means of the piston-cylinder structure 26 in the direction of the arrow 35 toward the workpieces 11, 12, which are engaged between the clamping element 18 and the support member 19. The pin-like projection 14 then engages the upper workpiece 11 with a predetermined adjustable pressure. The movement of the piston-cylinder structure is then terminated so that subsequently the spot-welding connection can be provided. If the spot-like welding joint is to have a certain "length", the piston cylinder unit 17 is activated so that the pivot arms 22 and 23 on which the head section 21 with the rotating pin-like projection 14 is mounted, is pivoted about the pivot axis 25. The resulting circular arc-like movement of the pin-like projection 14 provides for a corresponding circular arc section like weld seam which may still be considered to be a spot-weld that is limited in length either by a suitable control or by the stop 37. The maximum angle of rotation of the pivot arms 22, 23 determine the length 15 of the weld seam.

What is claimed is:

1. A device for joining, by friction stir welding, at least two workpieces which are disposed adjacent one another in the area in which they are to be joined, said device comprising:

a support structure including a head portion, a rotatable shaft supported on said head portion and having one end connected to drive means for rotating said shaft, said shaft having at its other end a pin-like projection, said support structure further including a support member for supporting said at least two workpieces below said pin-like projection, guide means for moving said rotating pin-like projection toward said at least two workpieces disposed on said support member and into contact therewith for plasticizing said workpieces in the contact area to form thereby a spot weld by friction stir welding, said guide means including pivot arms supporting said head portion so as to permit movement of said head portion with said pin-like projection about an axis which is essentially parallel to the pin-like projection for providing a lateral extension of said welding spot.

2. A device according to claim 1, wherein said pivot arms supporting said head portion are supported so as to be pivotable about a predetermined circular arc section during said friction stir welding procedure.

3. A device according to claim 2, wherein the length of said circular arc section corresponds essentially to the length of said welding seam formed by an extended welding spot formed by said friction stir welding procedure.

4. A device according to claim 1, including a piston-cylinder operating unit connected to one of said pivot arms for laterally moving said pin-like projection through said workpieces during the friction stir welding procedure.

5. A device according to claim 1, wherein said device includes a clamping element for engaging and holding said workpieces in position on said support member.

6. A device according to claim 4, including a second piston-cylinder operating unit for moving said clamping element onto said workpieces for holding them in position on said support member and for releasing said workpiece.

7. A device according to claim 1, wherein said head portion includes means for lowering said pin-like projection onto said workpieces and for retracting said pin-like projection.

8. A device according to claim 7, wherein said head portion is supported by spaced parallel pivot arms pivotally supported at one end by a rotatable support element of said support structure and pivotally connected at their other ends to said head portion so as to form a parallelogram-like structure permitting raising and lowering of said head portion and permitting pivoting of said parallelogram-like structures with said rotatable support element.

9. A device according to claim 8, including additional piston-cylinder units for raising and lowering said head portion and for rotating said rotatable support element.

* * * * *